US008688594B2

(12) United States Patent
Thomas et al.

(10) Patent No.: US 8,688,594 B2
(45) Date of Patent: Apr. 1, 2014

(54) SELF-SERVICE HOME BUYING (75) Inventors: Susan Smith Thomas, Gastonia, NC (US); Shane Anthony Johnson, Charlotte, NC (US); Johnny David Phillips, Charlotte, NC (US); Lisa D. Curry, Warwick, RI (US); Carrie Anne Hanson, Charlotte, NC (US); Todd Michael Ferrara, Charlotte, NC (US); Michael P. Toner, Cornelius, NC (US); Lauren Leigh Dearth, Singer Island, FL (US); Philip Alan Cravitz, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 323 days.

(21) Appl. No.: 13/069,796

(22) Filed: Mar. 23, 2011

(65) Prior Publication Data

US 2012/0246024 A1    Sep. 27, 2012

(51) Int. Cl.
*G06Q 50/00* (2012.01)

(52) U.S. Cl.
USPC .......................................... 705/314

(58) Field of Classification Search
USPC ......................... 705/26.1, 311, 314
See application file for complete search history.

(56) References Cited

U.S. PATENT DOCUMENTS

| | | | |
|---|---|---|---|
| 6,720,861 B1 * | 4/2004 | Rodenbeck et al. ......... 340/5.64 |
| 7,457,628 B2 | 11/2008 | Blumberg et al. | |
| 7,599,795 B1 | 10/2009 | Blumberg et al. | |
| 7,844,666 B2 | 11/2010 | Horvitz et al. | |
| 8,024,349 B1 * | 9/2011 | Shao et al. ..................... 707/769 |
| 8,346,796 B2 * | 1/2013 | Kardell ......................... 707/769 |
| 2004/0174247 A1 * | 9/2004 | Rodenbeck et al. ......... 340/5.64 |
| 2006/0015925 A1 * | 1/2006 | Logan ............................ 725/135 |
| 2007/0156429 A1 * | 7/2007 | Godar .............................. 705/1 |
| 2007/0255581 A1 * | 11/2007 | Otto et al. ........................ 705/1 |
| 2007/0271112 A1 * | 11/2007 | Davis ............................... 705/1 |
| 2008/0103787 A1 * | 5/2008 | Cavanaugh et al. ............. 705/1 |
| 2008/0120363 A1 * | 5/2008 | Loveland ....................... 709/203 |
| 2008/0140494 A1 * | 6/2008 | Charuk et al. ................... 705/8 |
| 2008/0150680 A1 * | 6/2008 | Casey et al. .................. 340/5.7 |
| 2008/0288336 A1 * | 11/2008 | Charuk et al. ................ 705/10 |
| 2009/0298514 A1 * | 12/2009 | Ullah ........................ 455/456.5 |
| 2010/0171600 A1 * | 7/2010 | Wu ......................... 340/286.06 |
| 2010/0223170 A1 * | 9/2010 | Bahar ............................ 705/34 |
| 2010/0312670 A1 * | 12/2010 | Dempsey ........................ 705/27 |

(Continued)

OTHER PUBLICATIONS

Ziprealty1, http://web.archive.org/web/20110315090746/http://www.ziprealty.com/homes/for-sale/search/baltimore/proximity, dated Mar. 15, 2011.*

(Continued)

*Primary Examiner* — Mark Fadok
(74) *Attorney, Agent, or Firm* — Michael A. Springs (57) ABSTRACT

According to some embodiments, a system comprises an interface and one or more processors. The interface receives a search request indicating that a buyer requests to search for properties to evaluate. The one or more processors determine one or more buyer preferences that describe preferred characteristics for the properties according to the buyer. The one or more processors also determine whether an available property located proximate to a device associated with the buyer satisfies at least a threshold amount of the buyer preferences. If the available property satisfies at least a threshold amount of buyer preferences, the interface communicates a notification recommending that the buyer evaluate the available property.

20 Claims, 3 Drawing Sheets

(56) References Cited

U.S. PATENT DOCUMENTS

2011/0184873 A1* 7/2011 Wilson et al. .................. 705/313
2011/0275441 A1* 11/2011 Wilson ............................. 463/42
2011/0289106 A1* 11/2011 Rankin et al. ................. 707/769

OTHER PUBLICATIONS

Ziprealty2, http://web.archive.org/web/20110301013415/http://ziprealty.com, dated Mar. 1, 2011.*
Ziprealty3, http://web.archive.org/web/201103041355837/http://ziprealty.com/homes/for-sale/search/baltimore/city, dated Mar. 4, 2011.*
Ziprealty4, http://web.archive.org/web/201000127112215/http://www.ziprealty.com/mortgate/index.jsp, dated Jan. 27, 2010.*
Ziprealty5 "Ziprealty teams with Bank of America to improveonline home buying experience", Reuters, Jul. 22, 2009.*
http://www.smarteragent.com, print date Jun. 22, 2011.
http://222.ziprealty.com, print date Jun. 22, 2011.
http://spatialmatch.com, print date Jun. 22, 2011.

* cited by examiner

FIG. 3

SELF-SERVICE HOME BUYING

TECHNICAL FIELD OF THE INVENTION

The present invention relates generally to property buying and more specifically to providing self-service property buying.

BACKGROUND OF THE INVENTION

Home buying typically involves many interactions between a number of parties, including a buyer, a seller, a real estate agent, and a financial institution. The buyer may rely on the real estate agent to find a property currently for sale, provide information about the property, and act as an intermediary between the buyer and the seller, for example, to arrange a tour or to negotiate the purchase price. The buyer may rely on the financial institution to obtain a home loan and to provide documentation indicating that the buyer is qualified to obtain the loan. Coordinating the many interactions between the parties may introduce inefficiencies or delays into the home buying process.

SUMMARY OF THE INVENTION

According to some embodiments, a system comprises an interface and one or more processors. The interface receives a search request indicating that a buyer requests to search for properties to evaluate. The one or more processors determine one or more buyer preferences that describe preferred characteristics for the properties according to the buyer. The one or more processors also determine whether an available property located proximate to a device associated with the buyer satisfies at least a threshold amount of the buyer preferences. If the available property satisfies at least a threshold amount of buyer preferences, the interface communicates a notification recommending that the buyer evaluate the available property.

Certain embodiments of the invention may provide one or more technical advantages. A technical advantage of one embodiment includes recommending homes for a buyer to consider purchasing based on the current location of the buyer and the buyer's preferences. Recommending homes based on the current location of the buyer allows the buyer to go to an area of interest and to determine nearby homes for sale. Another technical advantage of one embodiment includes providing the buyer with a self-service access code to allow the buyer to tour the home without requiring a real estate agent, a seller, or a tour guide to be present. Another technical advantage of one embodiment includes providing an indicator to indicate that the buyer has been pre-qualified or pre-approved for a home loan. The indicator may be communicated to a device associated with the user or to a real estate agent. The indicator may be used to approve the buyer for the self-service tour of the home.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
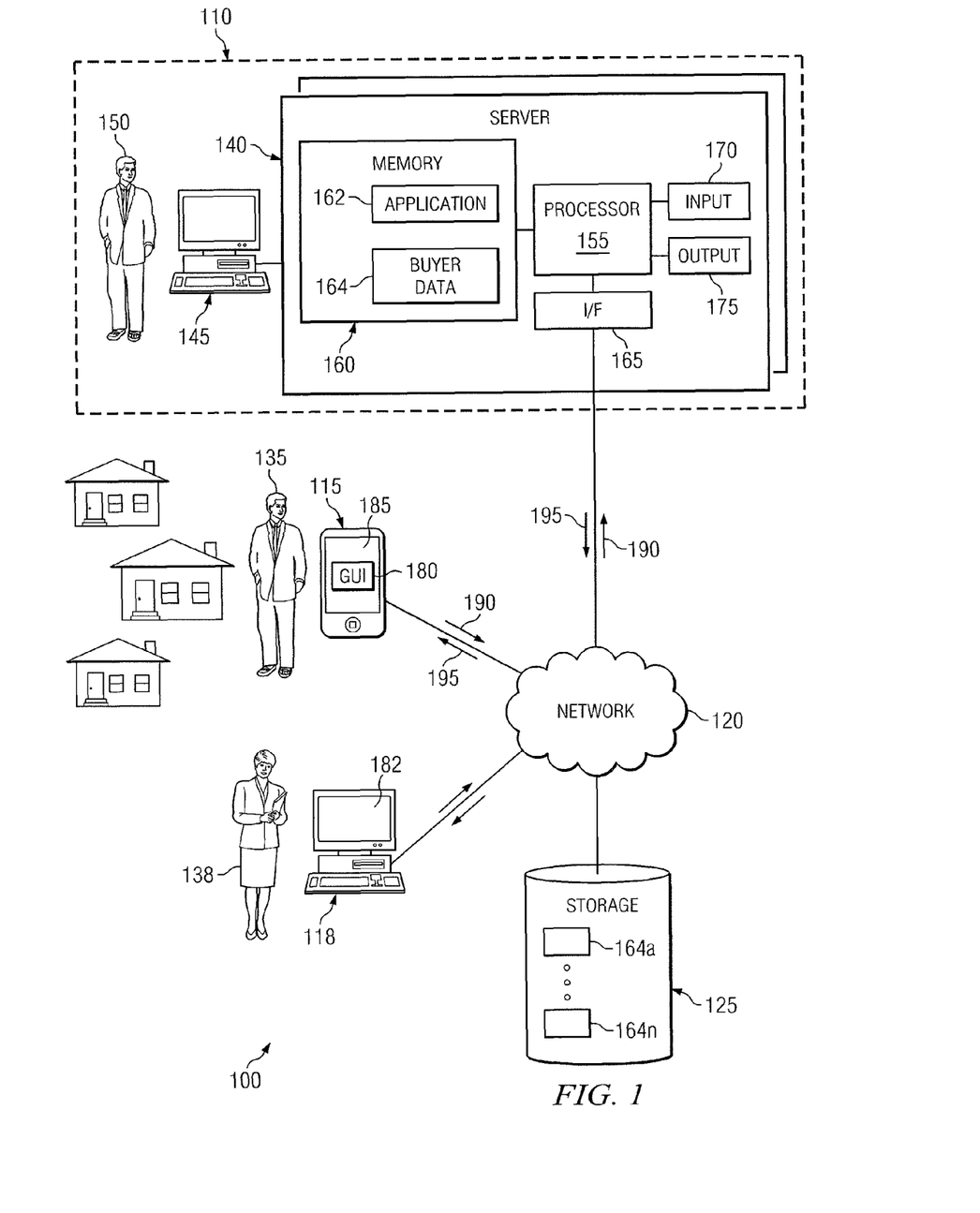
FIG. 1 illustrates an example of a self-service home buying system.
Figure 2:
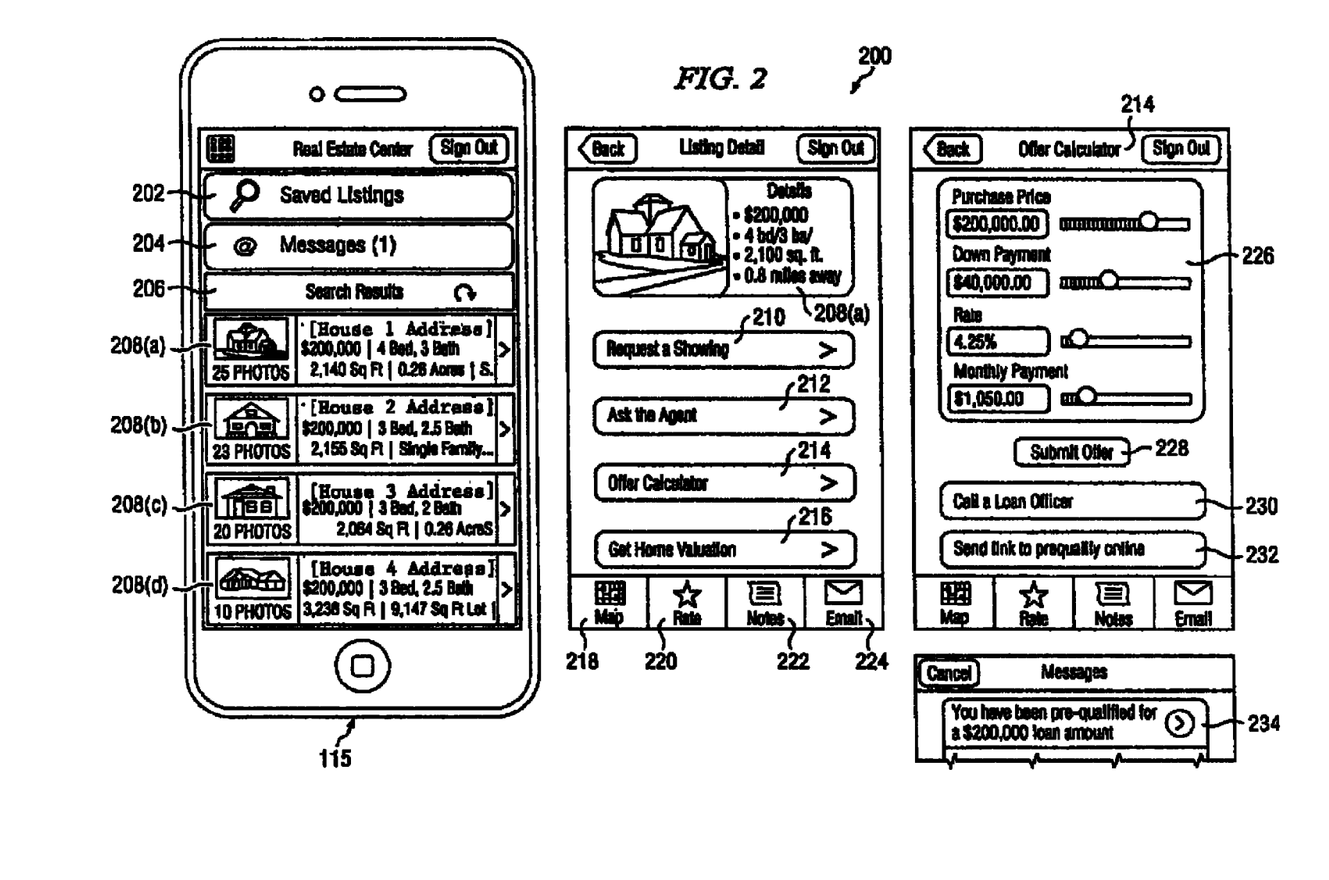
FIG. 2 illustrates an example of information communicated by a self-service home buying application.
Figure 3:
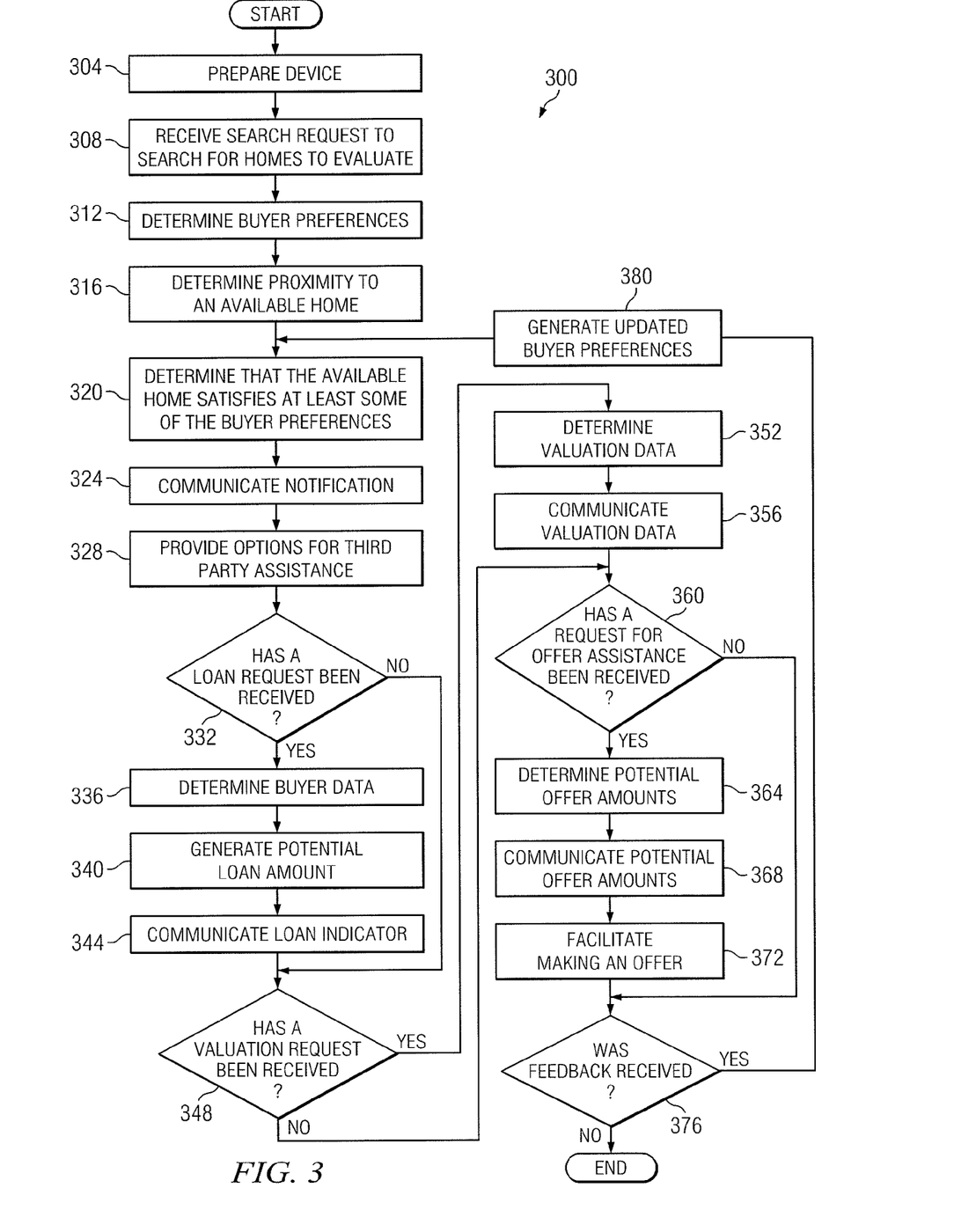
FIG. 3 illustrates a flowchart for a method of self-service home buying.

Embodiments of the present invention and its advantages are best understood by referring to FIGS. 1 through 3 of the drawings, like numerals being used for like and corresponding parts of the various drawings.

Home buying typically involves many interactions between a number of parties, including a buyer, a seller, a real estate agent, and a financial institution. The buyer may rely on the real estate agent to find a property currently for sale, provide information about the property, and act as an intermediary between the buyer and the seller, for example, to arrange a tour or to negotiate the purchase price. The buyer may rely on the financial institution to obtain a home loan and to provide documentation indicating that the buyer is qualified to obtain the loan. Coordinating the many interactions between the parties may introduce inefficiencies or delays into the home buying process.

The teachings of the disclosure recognize that it would be desirable to provide self-service home buying in order to reduce the buyer's dependency on other parties when shopping for a home. For example, self-service home buying may allow a buyer to search for homes that are for sale, establish that the buyer has been pre-qualified or pre-approved for a loan, take a self-service tour of the home, and/or make an offer on the home with less dependence on a real estate agent as compared to traditional home buying. Accordingly, self-service home buying may allow for expediting the purchase of a home as compared to traditional home buying.

FIGS. 1 through 3 below illustrate a system and method for self-service property buying. For purposes of example and illustration, FIGS. 1 through 3 are described with respect to home buying. However, the present disclosure contemplates facilitating self-service purchase of any suitable property, including a real estate property, such as a home (e.g., single-family house, duplex, apartment, condominium, etc.), a commercial property, an industrial property, a multi-unit property, etc., or a personal property, such as a vehicle (e.g., a car or a boat) or another large purchase property (e.g., a property for which a buyer may seek a loan from a financial institution in order to facilitate the purchase).

FIG. 1 illustrates a self-service home buying system 100 according to certain embodiments. System 100 may include an enterprise 110, one or more clients 115, a network storage device 125, one or more servers 140, and one or more users 135. Enterprise 110, clients 115, and network storage device 125 may be communicatively coupled by a network 120. Enterprise 110 is generally operable to receive a request 190 related to self-service home buying and to provide a response 195, as described below.

In some embodiments, user 135 may be a buyer interested in purchasing a home. User 135 may want information about homes for sale in a particular area without knowing specifically which homes are for sale. For example, user 135 may drive around town and arrive at a neighborhood of interest. To obtain additional information about homes for sale in the neighborhood, user 135 may initiate request 190 using client 115. Client 115 may refer to a portable computing device associated with user 135, such as a smartphone, a personal digital assistant (PDA), a laptop computer, and so on.

In general, one or more servers 140 may receive request 190 and provide response 195 to user 135. In some embodiments, user 135 may initiate one or more different types of requests 190 during a self-service home buying session. Examples of different types of requests 190 include a search request, a request for third party assistance, a loan request, a valuation request, or a request for offer assistance, as described below. Response 195 may be tailored according to the type of request 190.

A search request may be used to search for homes that are for sale, and response 195 may comprise a notification recommending homes for user 135 to consider touring and/or purchasing. The homes included in response 195 may be determined from the current location of user 135 (e.g., the area of interest) and buyer preferences provided by user 135.

A request for third party assistance may facilitate communication between user 135 and one or more third parties 138. Third parties 138 may include real estate agents, home inspectors, home repair specialists, or other third parties. Response 195 to a request for third party assistance may relay data from third party 138. For example, data may be relayed from a client 118 associated with third party 138 to client 115 associated with user 135 through a secure communication path. Additionally, response 195 may provide contact information for contacting third party 138.

A loan request may be used to request a determination whether a financial institution has pre-qualified or pre-approved user 135 for a home loan. Response 195 to a loan request may comprise an indicator indicating that user 135 has been pre-qualified or pre-approved for a loan. In some embodiments, response 195 may comprise a potential loan amount for which user 135 has been pre-qualified or pre-approved. The indicator may be used to approve user 135 to access certain self-service home buying services, such as a self-service tour of the home.

A valuation request may be used to request valuation data describing the value of the home. Examples of valuation data include an asking price, an appraisal value, offers made on the home by other potential buyers, known defects, and prices of comparable properties. Response 195 to a valuation request may include the valuation data.

A request for offer assistance may be used to generate potential offer amounts to be included in response 195. The potential offer amounts may be based on one or more potential loan amounts for which user 135 has been pre-qualified or pre-approved, a customized rate quote, and/or other factors, such as other sources of funding (e.g., a down payment) and other anticipated costs (e.g., estimated taxes and closing costs). In some embodiments, response 195 includes loan terms, such as the loan rate, loan duration, and/or monthly payment associated with each potential loan amount. User 135 may select a potential offer amount if the loan terms and other factors meet user 135's budget requirements.

Client 115 may refer to any device that enables user 135 to interact with server 140. Client 118 may be similar to client 115 and may refer to any device that enables third party 138 to interact with server 140 and/or client 115. In some embodiments, clients 115 and 118 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. Clients 115 and 118 may also comprise any suitable user interface such as a display 185, microphone, keyboard, or any other appropriate terminal equipment usable by a user 135. It will be understood that system 100 may comprise any number and combination of clients 115 and 118.

Client 135 may enable user 135 to interact with server 140 in order to send request 190 and receive response 195. In some embodiments, client 115 may include an application to facilitate self-service home buying. An example of a self-service home buying application is described with respect to FIG. 2 below.

In some embodiments, client 115 and client 118 may include a graphical user interface (GUI) 180 and GUI 182, respectively. GUI 180 is generally operable to tailor and filter data entered by and presented to user 135. GUI 180 may provide user 135 with an efficient and user-friendly presentation of request 190 and/or contact information 195. GUI 180 may comprise a plurality of displays having interactive fields, pull-down lists, and buttons operated by user 135. GUI 180 may include multiple levels of abstraction including groupings and boundaries. It should be understood that the term GUI 180 may be used in the singular or in the plural to describe one or more GUIs 180 and each of the displays of a particular GUI 180.

GUI 182 is generally operable to tailor and filter data entered by and presented to third party 138. GUI 182 may comprise a plurality of displays having interactive fields, pull-down lists, and buttons operated by third party 138. GUI 182 may include multiple levels of abstraction including groupings and boundaries. It should be understood that the term GUI 182 may be used in the singular or in the plural to describe one or more GUIs 182 and each of the displays of a particular GUI 182.

In some embodiments, network storage device 125 may refer to any suitable device communicatively coupled to network 120 and capable of storing and facilitating retrieval of data and/or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network storage device 125 may store any data and/or instructions utilized by server 140. In the illustrated embodiment, network storage device 125 stores buyer data 164a to 164n. In some embodiments, buyer data 164 may refer to data that an enterprise 110, such as a bank or other financial institution, associates with user 135. For example, buyer data 164 may include contact information, employment information, income and expenses information, debt information, and/or credit score information. Enterprise 110 may use buyer data 164 to determine whether to pre-qualify or pre-approve user 135 for a home loan.

In certain embodiments, network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, enterprise 110 may include one or more servers 140, an administrator workstation 145, and an administrator 150. In some embodiments, server 140 may refer to any suitable combination of hardware and/or software implemented in one or more modules to process data and provide the described functions and operations. In some embodiments, the functions and operations described herein may be performed by a pool of servers 140. In some embodiments, server 140 may include, for example, a mainframe, server, host computer, workstation, web server, file server, a personal computer such as a laptop, or any other suitable device operable to process data. In some embodiments, server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, server 140 receives request 190, determines response 195, and provides response 195 to users 135. In some embodiments, servers 140 may include a processor 155, server memory 160, an interface 165, an input 170, and an output 175. Server memory 160 may refer to any suitable device capable of storing and facilitating retrieval of data and/or instructions. Examples of server memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates server memory 160 as internal to server 140, it should be understood that server memory 160 may be internal or external to server 140, depending on particular implementations. Also, server memory 160 may be separate from or integral to other memory devices to achieve any suitable arrangement of memory devices for use in system 100.

Server memory 160 is generally operable to store an application 162 and buyer data 164. Application 162 generally refers to logic, rules, algorithms, code, tables, and/or other suitable instructions for performing the described functions and operations. In some embodiments, application 162 facilitates determining information to include in response 195.

Server memory 160 communicatively couples to processor 155. Processor 155 is generally operable to execute application 162 stored in server memory 160 to provide response 195 according to the disclosure. Processor 155 may comprise any suitable combination of hardware and software implemented in one or more modules to execute instructions and manipulate data to perform the described functions for servers 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for server 140, send output from server 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system, which allows server 140 to communicate to other devices. Communication interface 165 may include any suitable software operable to access data from various devices such as clients 115 and/or network storage device 125. Communication interface 165 may also include any suitable software operable to transmit data to various devices such as clients 115 and/or network storage device 125. Communication interface 165 may include one or more ports, conversion software, or both. In general, communication interface 165 receives request 190 from clients 115 and transmits response 195 to clients 115.

In some embodiments, input device 170 may refer to any suitable device operable to input, select, and/or manipulate various data and information. Input device 170 may include, for example, a keyboard, mouse, graphics tablet, joystick, light pen, microphone, scanner, or other suitable input device. Output device 175 may refer to any suitable device operable for displaying information to a user. Output device 175 may include, for example, a video display, a printer, a plotter, or other suitable output device.

In general, administrator 150 may interact with server 140 using an administrator workstation 145. In some embodiments, administrator workstation 145 may be communicatively coupled to server 140 and may refer to any suitable computing system, workstation, personal computer such as a laptop, or any other device operable to process data. In certain embodiments, an administrator 150 may utilize administrator workstation 145 to manage server 140 and any of the data stored in server memory 160 and/or network storage device 125.

In operation, application 162, upon execution by processor 155, facilitates determining response 195 and providing response 195 to users 135. To provide response 195, application 162 may first receive request 190 from users 135 via clients 115. In some embodiments, GUI 180 may provide locations for user 135 to enter request 190 and/or to select pre-filled options for request 190. Request 190 may include one or more identifiers indicating the type of request. Examples of requests include a search request, a request for third party assistance, a loan request, a valuation request, or a request for offer assistance.

Once application 162 receives request 190, application 162 determines response 195. Application 162 may perform any suitable steps for determining response 195 according to the type of request 190. In the following example, application 162 receives request 190 specifying a search request, and application 162 determines homes to recommend to user 135 in response 195.

Upon receiving a search request, application 162 may search for homes that are for sale, that are located within proximity to user 135's current location (e.g., within the area of interest), and that meet at least a portion of the buyer preferences indicated by user 135. To determine whether a home is for sale, application 162 may compare an identifier associated with the home to a list of properties that are known to be for sale (e.g., real estate owned (REO) listings, multiple listing service (MLS) listings, and/or new construction listings). Application 162 may obtain the list of properties that are known to be for sale from network storage device 125, server memory 160, and/or systems associated with third party 138. Alternatively, application 162 may determine the home is for sale based on the presence of an indicator associated with the home. For example, request 190 may include a barcode scanned from a "for sale" sign located in front of the home. Application 162 may determine the home is for sale based on the presence of the barcode.

Application 162 may determine that a home is located in the area of interest if client 115 associated user 135 is located proximate to the home. Any suitable method may be used to determine proximity. For example, client 115 may be determined to be proximate to a home if the global positioning system (GPS) coordinates of client 115 are within a pre-determined radius of the GPS coordinates of the home, such as within a pre-determined number of feet, blocks, or miles.

As another example, client 115 may be determined to be proximate to a home if client 115 is within the transmission range of a radio frequency identifier (RFID) associated with the home. As yet another example, client 115 may be determined to be proximate to a home if client 115 scans a barcode associated with the home, such as a barcode on a "for sale" sign in front of the home.

Buyer preferences describe preferred characteristics for the homes according to user 135. Application 162 may obtain buyer preferences from memory (e.g., network storage device 125 and/or server memory 160) and/or from client 115 associated with user 135. Application 162 may compare the characteristics of the homes that are for sale in the area of interest to the buyer preferences. If application 162 determines that at least a threshold amount of buyer preferences are satisfied by a particular home, application 162 communicates that home in response 195 via interface 165 to client 115.

As described above, application 162 may determine and provide responses 195 for other types of requests 190, such as requests for third party assistance, loan requests, valuation requests, and requests for offer assistance. FIG. 3 below provides examples of methods that may be performed by application 162 in order to determine responses 195 to such requests 190.

In some embodiments, enterprise 110 may mine data provided by users 135 and maintain the data in a database. The mined data may be used to determine trends among users 135. For example, users 135 in a certain part of the country may tend to search for homes within a certain price range. As another example, the mined data may indicate features that users 135 tend to prefer, such as the presence or absence of a swimming pool. The mined data may be parsed to determine, for example, whether users 135 searching for homes in warmer climates tend to prefer a swimming pool more frequently than users 135 searching for homes in cooler climates. As another example, mined data may indicate statistics, such as the average amount of time elapsed between performing a first search and making an offer on a home, the average number of homes users 135 look at before making an offer on a home, financial data, relationships among financial data (e.g., relationships between searched price range, loan amount, loan rate, asking price, and/or offer amount), etc. Enterprise 110 may use the mined data to formulate its business strategy.

In some embodiments, application 162 may access mined data associated with a particular user 135 to tailor recommendations to that user. For example, if user 135 rejects several one-story houses and likes several two-story houses, application 162 may recommend more two-story houses to user 135 during a subsequent search.

FIG. 2 illustrates an example of information that a self-service home buying application 200 installed on client 115 communicates to user 135. Upon accessing self-service home buying application 200, user 135 may retrieve saved listings 202 describing homes that user 135 previously evaluated and liked or other listings that user 135 flagged for further consideration. In addition, user 135 may retrieve messages 204. Messages 204 may include e-mail, voicemail, or other messages related to home buying. For example, messages 204 may include loan pre-qualification or pre-approval information provided by a financial institution, information about a home provided by a real estate agent, advertisements from home repair specialists offering to repair known defects associated with a particular home, messages from family members or friends recommending areas of interest or homes for user 135 to consider, or other messages.

As described in FIG. 1, user 135 may travel to a location of interest and initiate a search request (e.g., request 190). FIG. 2 illustrates an example of search results 206 that may be included in a notification recommending homes to evaluate (e.g., response 195). Search results 206 may comprise a plurality of available home summaries 208. Each available home summary 208 may summarize key facts about the home, such as address, asking price, number of square feet, number of acres, number of bedrooms, number of bathrooms, and a photograph.

User 135 may select an available home summary 208 to obtain more detailed information about the home. In some embodiments, self-service home buying application 200 may include menus to provide access to the detailed information and/or to allow user 135 to initiate additional requests 190 regarding a home of interest. For example, request a showing menu 210 and ask the agent menu 212 may allow user 135 to initiate a request for third party assistance. As another example, offer calculator menu 214 may allow user 135 to request offer assistance. As yet another example, get home valuation menu 216 may allow user 135 to initiate a valuation request.

In some embodiments, self-service home buying application includes a map feature 218, a rate feature 220, a notes feature 222, and an e-mail feature 224. Map feature 218 depicts an area surrounding the available home and/or provides directions from user 135's current location to the available home. Rate feature 220 indicates a loan rate for which user 135 has been pre-qualified or pre-approved. Notes feature 222 allows user 135 to take notes associated with an available property. User 135 may use the notes as a reminder of the pros and cons associated with the available home. In addition, user 135 may update the buyer preferences according to the pros and cons. E-mail feature 224 allows user 135 to e-mail third parties for assistance, such as real estate agents, home repair specialists, or loan officers. In addition, user 135 may e-mail information describing the available home to a spouse, roommate, or other person helping user 135 make the home buying decision.

Offer calculator feature 214 may include a calculating portion 226. Calculating portion may allow user 135 to calculate a purchase price (e.g., a potential offer amount) according to a down payment, a loan rate, a monthly payment, or other financial factors. User 135 may adjust the financial factors to determine a potential offer amount that meets user 135's budget requirements. In some embodiments, user 135 may have the option of having certain financial factors automatically populated. For example, if user 135 has been pre-qualified or pre-approved for a loan, the loan rate of calculating portion 226 may be automatically populated with the pre-qualified or pre-approved loan rate.

In some embodiments, offer calculator feature 214 includes a submit offer button 228 to facilitate making an offer on a home. For example, submit offer button 228 may allow user 135 to communicate an offer to a real estate agent. In addition, offer calculator feature 214 may include a call loan officer button 230 and/or a send link to pre-qualify online button 232. These buttons may be used to initiate obtaining a loan, a pre-qualification for a loan, or a pre-approval for a loan. As an example, pre-qualify online button 232 may be used to initiate sending a loan request (e.g., request 190). Response 195 may comprise an indicator, such as pre-qualification indicator 234 describing the loan amount for which user 135 has been pre-qualified.

In some embodiments, application 200 may engage user 135 by providing status information and/or requesting input from user 135 during the stages of applying for a loan.

Examples of stages include a preparation stage, a request stage, a processing stage, an underwriting stage, and a clearance stage. Application 200 may provide user 135 with an overview of the stages and inform user 135 when a stage is reached. As an example, application 200 may provide a status during the stages, such as texts or other alerts when a phase code changes, documents have been received, documents are ready for signature, issues in the fulfillment process have occurred, or hurdles have been cleared. In some embodiments, user 135 may be instructed to login to a secure website to receive more detailed information or to provide a response to the alert.

In some embodiments, application 200 may request information from user 135 that may be needed to advance to the next stage. User 135 may provide certain information through application 200 and/or user 135 may provide certain information independently of application 200. As an example, during the preparation stage, user 135 may schedule an appointment with a loan officer using application 200. As another example, during the request stage, user 135 may meet with the loan officer off-line to sign a loan application. Upon completion of the request stage, application 200 may send a notification confirming that the loan application is ready to be processed. Although certain examples have been described, application 200 may facilitate communicating any suitable information at any stage of the loan application process. In some embodiments, user 135 may opt-in or opt-out of receiving loan status information.

In some embodiments, user 135 may request a customized rate quote. As an example, user 135 may click on an icon of self-service home buying application 200 to request the customized rate quote. The icon may be associated with questions for user 135 to answer. The questions may request user 135 to provide information that describes the loan for which the customized rate quote has been requested. Examples of information describing the loan include a type of loan (e.g., New Purchase, Refinance, or Home Equity), the amount of the loan (e.g., the dollar amount), the type of product (e.g., 30 year mortgage, 15 year mortgage, 7/1 adjustable-rate mortgage, etc.), and/or other information for determining the customized rate quote. The customized rate quote may be determined according to the information provided by user 135, and the customized rate quote may be communicated to user 135. In some embodiments, applicable disclosures associated with the customized rate quote may be communicated to user 135. The customized rate quote may be used for any suitable purpose. For example, the customized rate quote may be automatically populated in the loan rate field of offer calculator feature 214 to facilitate calculating an offer amount. As another example, customized rate quote may be communicated to a financial institution to initiate obtaining a loan, a pre-qualification for a loan, or a pre-approval for a loan according to the customized rate quote. In some embodiments, user 135 may click call loan officer button 230 and/or send link to pre-qualify online button 232 to facilitate sending the customized rate quote to the financial institution.

In some embodiments, application 200 may provide a news ticker (not shown). In some embodiments, the news ticker may provide updated information describing homes that user 135 may be interested in. For example, the news ticker may notify user 135 if the asking price drops or if someone else makes an offer on the home. In some embodiments, the news ticker may scroll information about available homes nearby or a subset of homes that satisfy the buyer preferences of user 135. As user 135 travels from one location to another, the homes described by the news ticker may be updated according to user 135's current location. Thus, news ticker may cease providing information describing homes that user 135 has moved farther away from and may begin describing homes that user 135 has moved closer to. In some embodiments, the news ticker may notify user 135 that an open house is taking place in the area.

FIG. 3 illustrates an example of a method 300 for self-service home buying. The method begins at step 304 where a buyer prepares a device for self-service home buying. In some embodiments, the buyer prepares the device by installing a self-service home buying application on a smartphone, a personal digital assistant (PDA), a laptop computer, or other portable computing device associated with the buyer. The application may be downloaded from a website or obtained from any other suitable source. In some embodiments, the buyer may pre-configure the self-service home buying application with personalized information, such as a password for accessing the application, addresses of homes or neighborhoods that the buyer would like to see, buyer preferences, and/or contact information associated with the buyer's financial institution, real estate agent, and so on. The configuration information may be stored locally on the device or remotely, for example, in a database associated with a server operable to facilitate self-service home buying.

Once the device has been prepared, the buyer may walk or drive around a geographic area looking for homes that are for sale. If the buyer arrives at a neighborhood, a street, or other area of interest, he may want to search for homes that are for sale in the area. The buyer may activate the self-service home buying application to initiate a search request requesting to search for nearby homes to evaluate.

At step 308, the method receives the search request, and at step 312, the method determines buyer preferences. The buyer preferences describe preferred characteristics for the homes according to the buyer. The buyer may select any suitable characteristics to customize to according to the buyer's personal preferences. Examples of buyer preferences include, but are not limited to, a location (e.g., city, zip code, school district, or proximity to particular resource, such as a park, a golf course, a major roadway, a place of business, etc.), a price range, a size (square footage, yard size, or number of bedrooms, bathrooms, garage spaces, etc.), a type of floor plan, a presence of a swimming pool, construction information (e.g., date of construction, date of renovations, materials used), a type of home (e.g., single-family house, duplex, apartment, condominium, etc.), a move-in date, and/or an occupied/unoccupied status. The buyer preferences may be retrieved from computerized storage, such as memory of the device or database records that a server associates with the buyer. In addition, the buyer may optionally submit new buyer preferences or updated buyer preferences. In some embodiments, the buyer preferences may be used to request a list of nearby properties that are available for a tour. Properties available for a tour may include homes capable of facilitating a self-service tour and/or homes that are hosting an open house.

The method proceeds to step 316 where it is determined that the device associated with the buyer is located proximate to an available home (i.e., a home that is for sale). Any suitable method may be used to determine proximity. For example, the device may be determined to be proximate to a home if the global positioning system (GPS) coordinates of the device are within a pre-determined radius of the GPS coordinates of the home, such as within a pre-determined number of feet, blocks, or miles. As another example, the device may be determined to be proximate to a home if the device is within the transmission range of a radio frequency identifier (RFID) associated with the home. As yet another example, the device may be determined to be proximate to a home if the device scans a barcode associated with the home, such as a barcode on a "for sale" sign in front of the home.

To determine that the home is available for sale, the GPS coordinates, RFID, barcode identifier, address, or other information describing the home may be compared to a list properties that are known to be for sale (e.g., real estate owned (REO) listings, multiple listing service (MLS) listings, and/or new construction listings). Alternatively, the presence of an RFID, a barcode, or other indicator associated with the home may sufficiently indicate availability without requiring a comparison to a list of properties that are known to be for sale.

At step 320, the method determines that the available home satisfies the buyer preferences. The available home may satisfy the buyer preferences if at least a threshold amount of buyer preferences are satisfied. In some embodiments, the threshold may be a number (e.g., at least 1, 2, 3, or other number of buyer preferences are satisfied), a percentage (e.g., at least 50%, 75%, 90%, or other percentage of buyer preferences are satisfied), or priority-based value (e.g., at least the buyer's high priority or "must-have" preferences are satisfied). The threshold may be set to a particular value or according to an algorithm. In some embodiments, the threshold may be set by the buyer, by an administrator, or other suitable person.

The method communicates a notification at step 324. The notification recommends that the buyer evaluate one or more available homes. The available homes recommended by the notification satisfy at least some of the buyer preferences and are located near the current location of the buyer (e.g., within the area of interest to the buyer). In some embodiments, the notification may include information associated with a particular available home or a link for accessing such information. Information may include the street address, a map of the surrounding area, and directions from the buyer's current location to the available property. Additionally, the information may include a description of the available home, such as an asking price, a number of bedrooms and bathrooms, a virtual tour (e.g., video, photographs, floor plans, etc.), and/or other information that the buyer may use to determine whether he would like to consider touring or purchasing the available home. In some embodiments, the notification may highlight a subset of the available homes, for example, the homes that best match the buyer preferences or homes that may be good deals, such as homes where the asking price has been recently reduced or is below market value. As another example, the notification may highlight homes that are located near the buyer (e.g., according to GPS coordinates), that satisfy the user preferences, and that are hosting an open house. In some embodiments, the method may determine the homes that are hosting an open house based on information provided in MLS or other listings. The notification may highlight homes that have an open house in progress and/or homes scheduled to host an open house within a certain time period, such as within an hour, within a few hours, within the same day, within a week, within a month, etc.

In some embodiments, the method provides the buyer with the option to obtain third party assistance at step 328. For example, the method may facilitate communications between the buyer and one or more third parties including, but not limited to, real estate agents, sellers, occupants of the property, loan officers, title lawyers, appraisers, home inspectors, and/or home repair specialists. Third parties may refer to individual persons or businesses, as well as associated computerized systems for assisting the buyer using automated processes. In some embodiments, authentication, authorization, and/or other techniques may be used to ensure adequate security and privacy of the data being communicated between the buyer and the third party.

The method may facilitate communications between the buyer and third parties in any suitable manner. For example, the method may provide an advertisement from a home repair specialist, and the buyer may click on the advertisement to communicate with the home repair specialist. As another example, the method may provide a link to a third party with whom the buyer has an existing relationship, such as the buyer's real estate agent. As another example, the method may provide the buyer with access to a bidding platform. The buyer may submit a request for a service to the bidding platform. The bidding platform communicates the request to a pool of vendors, and one or more of the vendors may bid to provide the service to the buyer. Examples of requests that may be submitted to the bidding platform include a request for roof repair, a request for a home inspection, a request for legal services (e.g., a title lawyer), a request for real estate agent services, and so on. The bid may include price, the vendor's available appointment times, reputation of the vendor (e.g., recommendations or ratings from review organizations or other customers), and/or other information that the buyer may use to determine whether or not to accept the bid.

Examples of requests that may seek assistance from third parties include loan requests described in step 332, valuation requests described in step 348, and requests for offer assistance described in step 360.

At step 332, the method determines whether a loan request was received. A loan request may request assistance from a financial institution/loan officer to establish that the buyer would likely be able to get a loan. For example, a loan request may be used to establish that the buyer has been pre-qualified or pre-approved for a loan. Pre-qualification may refer to a tentative decision that the buyer qualifies for a loan. A pre-qualification decision may be made from relatively high-level information about the buyer, such as social security number and information about the buyer's employment, income, assets, general credit worthiness, and the amount of current monthly debt. Pre-approval may refer to a tentative decision that the buyer will be approved for a loan. A pre-approval decision may be made from information similar to pre-qualification information as well as other information. For example, a pre-approval decision may require verification information to verify that the income and credit worthiness information provided by the buyer is thorough and accurate. If a loan inquiry was received at step 332, the method proceeds to step 336, otherwise, the method skips to step 348.

At step 336, the method determines buyer data. The buyer data may include contact information, employment information, income and expenses information, debt information, credit score information, or other information that a financial institution uses to pre-qualify or pre-approve the buyer for a loan. If the buyer is an existing customer of one or more lines of business of the financial institution, the financial institution may retain certain buyer data on file. For example, the financial institution may maintain a database comprising contact information, account status information, or other buyer data. The financial institution may request additional buyer data from the buyer or a third party, such as a credit reporting bureau, as needed.

The method proceeds to step 340 to generate a potential loan amount based on buyer data. The potential loan amount may refer to a loan amount for which the buyer has been pre-qualified or pre-approved. The potential loan amount may be associated with loan terms, such as a loan duration and a loan rate. In some embodiments, the method generates a plurality of potential loan amounts to provide the buyer with the flexibility to select the loan terms that the buyer prefers.

The method communicates a loan indicator at step 344. The loan indicator indicates that a potential loan amount has been generated. Any suitable information may be provided to indicate that a potential loan amount has been generated. For example, the loan indicator may indicate that the buyer has been pre-qualified or pre-approved for a loan in general. Or, the loan indicator may provide more specific information, such as the potential loan amount and/or the loan terms for which the buyer has been pre-qualified or pre-approved. The loan indicator may be communicated to a loan officer, to a real estate agent, to the buyer, or to a combination of the preceding.

In some embodiments, the loan indicator may comprise a letter of pre-qualification or a letter of pre-approval from the financial institution. The letter may optionally be customized based on the buyer and/or based on the available home where the buyer is currently located. As an example, the method may determine the home's asking price X and address Y (e.g., street number, city, state, and/or zip code) and the asking price. The method may prompt the user to enter asking price X and/or address Y. Or, the method may automatically determine the information. As an example, address Y may be determined according to the GPS coordinates where the buyer is currently located, and asking price X may be determined according to a listing associated with address Y. The letter may state that the bearer (e.g., buyer's name or other information) has been prequalified for the home with an asking price X at address Y. The letter may indicate that it is an official notice from the financial institution, and may include legal information and/or disclaimers. To generate the customized letter, in some embodiments, the buyer may pre-qualify for homes within a certain price range in advance. The buyer's pre-qualified price range may be stored in memory (e.g., a database). Upon receiving a request for a customized letter, the method may determine if asking price X falls within the pre-qualified price range. The customized letter may be generated if asking price X falls within the pre-qualified price range.

The loan indicator may be used for any suitable purpose. For example, loan indictors including the potential loan amount may be used to update a price range indicated by the buyer preferences. The price range may be selected based on the potential loan amount and other factors, such as a margin above or below the potential loan amount or adjustments to account for other sources of funding (e.g., a down payment) or anticipated costs (e.g., estimated taxes and closing costs).

In some embodiments, the loan indicator may be used to facilitate the buyer's access to the home for a tour. As an example, the loan indicator may be required to arrange a self-service tour of the home. During a self-service tour, the buyer may be provided with self-service access to the property without requiring the seller, real estate agent, or other tour guide to be present. In order to approve the buyer for a self-service tour, the loan indicator may be communicated to the real estate agent. The buyer may communicate the loan indicator to the real estate agent using a smartphone or other device associated with the buyer or, alternatively, the buyer may request the financial institution to communicate the loan indicator directly to the real estate agent. The real estate agent may approve the buyer for the self-service tour if the loan indicator indicates that the buyer has provided sufficient identification information and/or that the buyer would likely be able to afford the home. Although the preceding example has been described with respect to using the loan indicator to facilitate approving the buyer for the self-service tour, in other embodiments, the buyer may be approved for the self-service tour using any suitable information. Examples of other such information may include a social security number, a driver's license number, a credit card number, or a combination of the preceding.

Once the buyer has been approved for a self-service tour, an access code or other means of accessing the home may be provided to the buyer. In some embodiments, the access code may be a randomly generated code that allows temporary access to the home. The access code may be communicated to the buyer, and the buyer may enter the access code into a keypad associated with the home (e.g., a keypad on the door or on a lockbox). Alternatively, the buyer's smartphone or another device associated with the buyer may provide the access code to a controller operable to unlock the door. For example, the device may communicate the access code using a wireless signal. As yet another alternative, the real estate agent may initiate sending the access code to a controller operable to unlock the door, for example, via the internet, without the buyer or the buyer's device receiving the access code. Although the preceding example has been described with respect to a self-service tour, the loan indicator may be used to schedule a traditional tour of the home in which the seller or real estate agent is present.

As yet another example, the loan indicator may be used to facilitate determining a potential offer amount, as described with respect to steps 360 to 372 below.

In some embodiments, the information provided by the loan indicator may be customized depending on the state in which the home is located. In particular, the type of information required to be pre-qualified or pre-approved for a loan, to arrange a tour of the home, or to make an offer on the home may differ from one state to another. For example, the requirements under Arizona law may differ from the requirements under Illinois law. Accordingly, the loan indicator may be customized to ensure that the information provided is sufficient to meet the requirements of the applicable jurisdiction.

If a buyer decides that he likes a home, he may consider making an offer to purchase the home. When determining whether to make an offer, the buyer may find it useful to consider valuation data describing the value of the home. Accordingly, the buyer may submit a valuation request to obtain the valuation data. At step 348, the method determines if a valuation request has been received. If a valuation request has been received, the method continues to step 352. If a valuation request has not been received, the method skips to step 360.

At step 352, the method determines valuation data. Valuation data may include the asking price, an appraisal value, offers made on the home by other potential buyers, known defects, prices of comparable properties, and/or other data that may be used to determine the value of the home. In some embodiments, valuation data may be determined from multiple information sources. For example, a server operable to facilitate self-service home buying may aggregate valuation data from a database with valuation data from third parties. The method communicates the valuation data at step 356.

In some embodiments, the buyer may request assistance in making an offer. The method determines if a request for offer assistance has been received at step 360. If offer assistance has been requested, the method continues to step 364. Otherwise, the method skips to step 376.

At step 364, the method determines one or more potential offer amounts. The potential offer amounts may be determined from the potential loan amounts and associated loan terms described with respect to steps 332 to 344. The potential offer amounts may take into account other sources of funds (e.g., a down payment) and other anticipated costs (e.g., estimated taxes and closing costs).

In some embodiments, the potential offer amount may be determined from a customized rate quote. The customized rate quote may be determined according to information provided by the buyer that describes a requested loan, such as a type of loan (e.g., New Purchase, Refinance, or Home Equity), the amount of the loan (e.g., the dollar amount), the type of product (e.g., 30 year mortgage, 15 year mortgage, 7/1 adjustable-rate mortgage, etc.). The customized rate quote may refer to a rate associated with a potential loan amount for which the buyer has been pre-qualified, pre-approved, or approved. Alternatively, the customized rate quote may refer to a rate for which the buyer has not yet requested pre-qualification, pre-approval, or approval. Accordingly, the method may provide the buyer with the option to apply for a loan based on the customized rate quote.

The method communicates the potential offer amounts at step 368. The buyer may compare the potential offer amounts and request adjustments in order to determine the down payment amount, the loan rate, loan duration, monthly payment amount, or other loan terms that meet the buyer's preferences.

At step 372, the method facilitates making an offer. For example, the method may accept an offer amount selected by the user at step 368 and submit the offer amount to the real estate agent or the seller. In some embodiments, the method may allow the buyer to submit an initial offer, a maximum offer amount, and an increment. If someone else makes a higher offer on the home, the method may automatically increase the buyer's offer according to the increment until either the offer has been accepted or the maximum offer amount has been reached. The method may notify the buyer when the maximum offer amount has been reached so that the buyer may determine whether to continue increasing the offer. The method may prevent the buyer from submitting an offer that exceeds the appraisal value of the home.

In some embodiments, the method may accept feedback from the buyer. For example, the method may prompt the buyer for feedback or may provide an option for the buyer to initiate feedback. As an example, feedback may indicate a decision whether the buyer liked or disliked the home and a reason for the buyer's decision. At step 376, the method determines whether feedback was received.

If feedback was received the method proceeds to step 380 to generate updated buyer preferences. In some embodiments, the feedback may be used to better tailor recommendations to the buyer's personal preferences. The more feedback that is received, the smarter the application may become. For example, the feedback may indicate that the buyer likes or dislikes a home due to certain features. During subsequent searches, homes including liked features may be automatically recommended and/or homes including disliked features may be automatically omitted (i.e., not recommended). As an example, if the buyer indicates that he disliked the property because it did not have a swimming pool, the buyer preferences may be updated to include a swimming pool preference, and the application may recommend homes with swimming pools during subsequent searches. As another example, if the buyer indicates he disliked the property because the price was too high, but that he liked the other features of the property, the application may recommend similar homes available at a lower price. In some embodiments, the buyer may manually optionally update the buyer preferences, for example, if the buyer changes his mind about a liked or disliked feature.

The method then returns to step 320 to determine additional available homes that satisfy the updated buyer preferences. The additional available homes may be located in the same area of interest in which the buyer is currently located. Alternatively, the method may recommend additional available homes located in other areas that the buyer may also like based on the updated buyer preferences. In some embodiments, the buyer may request to see similar homes available in another location. Examples of reasons for looking for similar homes in another location may include the current home is occupied, the earliest available move-in date for the current home occurs after the buyer would like to move in, another party has already made an offer on the current home, the buyer likes the current home but prefers another neighborhood (e.g., within another school district or closer to a golf course), or other suitable reason. In some embodiments, the user may specify the location to look for similar homes, for example, according to a preferred neighborhood, the distance from the current location, or other criteria. Alternatively, the application may recommend other locations to look for similar homes, for example, based on the distance from the current location or buyer preferences. Accordingly, in some embodiments, the buyer preferences may include preferences describing the community in which the buyer prefers the property to be located, such as near a golf course, a park, or a community swimming pool.

In some embodiments, updated buyer preferences may be compared to preferences provided by other shoppers, and the preferences of the other shoppers may be used for determining additional available homes to recommend to the buyer. For example, if the buyer indicates that he likes a first home, the method may determine a subset of other shoppers that also liked the first home. The method may then determine other homes that the subset of other shoppers also liked, and may recommend the other homes to the buyer. In some embodiments, the recommended other homes may be ranked, for example, according to how frequently shoppers that liked the first home also liked the other home. As another example, if the buyer indicates that he dislikes certain features of a first home, the method may determine a subset of other shoppers that disliked the same features of the first home. The method may then determine other homes that the subset of shoppers liked, and may recommend the other homes to the buyer. In some embodiments, the recommended other homes may be ranked, for example, according to how frequently shoppers that disliked the first home liked the other home.

If no feedback was received at step 376, the method ends.

Modifications, additions, or omissions may be made to the systems described herein without departing from the scope of the invention. The components may be integrated or separated. Moreover, the operations may be performed by more, fewer, or other components. For example, although certain operations have been described as being performed by components of a server, in alternative embodiments, the operations may be performed by components associated with a client. Additionally, the operations may be performed using any suitable logic comprising software, hardware, and/or other logic. As used in this document, "each" refers to each member of a set or each member of a subset of a set.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described in detail, it should be understood that various changes, substitutions, and alterations can be made hereto without departing from the scope of the invention as defined by the appended claims.

What is claimed is:

1. A system, comprising:
an interface operable to:
receive a search request indicating that a buyer requests to search for properties to evaluate; and
one or more processors operable to:
determine one or more buyer preferences, the buyer preferences describing preferred characteristics for the properties according to the buyer;
determine that a device associated with the buyer is located proximate to an available property; and
determine whether the available property satisfies at least a threshold amount of the buyer preferences; and
the interface further operable to communicate a notification recommending that the buyer evaluate the available property if the home satisfies at least the threshold amount of the buyer preferences; and
the one or more processors further operable to facilitate access to the available property by communicating an access code to a controller, the access code operable to cause the controller to unlock the available property for a self-service tour without a user input at the controller, the access code communicated in response to determining that the buyer potentially qualifies for a loan sufficient to purchase the available property, wherein the controller is distinct from the device associated with the buyer and the access code is not communicated to the device associated with the buyer.

2. The system of claim 1, wherein:
one of the buyer preferences comprises a price range;
the interface further operable to receive a loan request;
the one or more processors further operable to:
determine buyer data associated with the buyer; and
generate a potential loan amount according to the buyer data; and
the interface further operable to communicate the potential loan amount to facilitate determining the price range.

3. The system of claim 1, wherein:
the interface further operable to communicate a customized letter to facilitate the access to the available property for the self-service tour, the customized letter indicating that a financial institution pre-qualifies the buyer for a loan sufficient to meet a price associated with the available property located proximate to the buyer.

4. The system of claim 1, wherein:
the interface further operable to receive feedback describing the buyer's evaluation of the available property;
the one or more processors further operable to:
generate updated buyer preferences according to the feedback; and
determine that a second available property satisfies at least a threshold amount of the updated buyer preferences; and
the interface further operable to communicate a second notification recommending that the buyer evaluate the second available property.

5. The system of claim 1, wherein:
the interface further operable to receive a valuation request for valuation data describing the available property;
the one or more processors further operable to:
determine valuation data from a first information source and a second information source; and
aggregate the valuation data provided by the first information source with the valuation data provided by the second information source; and
the interface further operable to communicate the aggregated valuation data.

6. The system of claim 1, wherein:
the interface further operable to receive a request for offer assistance;
the one or more processors further operable to:
determine a potential offer amount based on one or more factors, at least one of the factors comprising a potential loan amount or a customized rate quote; and
the one or more processors further operable to communicate the potential offer amount.

7. A non-transitory computer readable storage medium comprising logic, the logic, when executed by a processor, operable to:
receive a search request indicating that a buyer requests to search for properties to evaluate;
determine one or more buyer preferences, the buyer preferences describing preferred characteristics for the properties according to the buyer;
determine that a device associated with the buyer is located proximate to an available property;
determine whether the available property satisfies at least a threshold amount of the buyer preferences;
if the home satisfies at least the threshold amount of the buyer preferences, communicate a notification recommending that the buyer evaluate the available property; and
facilitate access to the available property by communicating an access code to a controller, the access code operable to cause the controller to unlock the available property for a self-service tour without a user input at the controller, the access code communicated in response to determining that the buyer potentially qualifies for a loan sufficient to purchase the available property, wherein the controller is distinct from the device associated with the buyer and the access code is not communicated to the device associated with the buyer.

8. The logic of claim 7, wherein one of the buyer preferences comprises a price range and the logic further operable to:
receive a loan request;
determine buyer data associated with the buyer;
generate a potential loan amount according to the buyer data; and
communicate the potential loan amount to facilitate determining the price range.

9. The logic of claim 7, further operable to communicate a customized letter to facilitate the access to the available property for the self-service tour, the customized letter indicating that a financial institution pre-qualifies the buyer for a loan sufficient to meet a price associated with the available property located proximate to the buyer.

10. The logic of claim 7, further operable to:
receive feedback describing the buyer's evaluation of the available property;
generate updated buyer preferences according to the feedback;
determine that a second available property satisfies at least a threshold amount of the updated buyer preferences; and
communicate a second notification recommending that the buyer evaluate the second available property.

11. The logic of claim 7, further operable to:
receive a valuation request for valuation data describing the available property;
determine valuation data from a first information source and a second information source;
aggregate the valuation data provided by the first information source with the valuation data provided by the second information source; and
communicate the aggregated valuation data.

12. The logic of claim 7, further operable to facilitate determination of an offer amount by:
receiving a request for offer assistance;
determining a potential offer amount based on one or more factors, at least one of the factors comprising a potential loan amount or a customized rate quote; and
communicating the potential offer amount.

13. The logic of claim 7, further operable to:
approve the buyer for a self-service tour of the available property; and
provide the buyer with self-service access to the available property.

14. A method, comprising:
receiving a search request indicating that a buyer requests to search for properties to evaluate;
determining, by a processor, one or more buyer preferences, the buyer preferences describing preferred characteristics for the properties according to the buyer;
determining that a device associated with the buyer is located proximate to an available property;
determining whether the available property satisfies at least a threshold amount of the buyer preferences;
if the home satisfies at least the threshold amount of the buyer preferences, communicating a notification recommending that the buyer evaluate the available property; and
facilitating access to the available property by communicating an access code to a controller, the access code operable to cause the controller to unlock the available property for a self-service tour without a user input at the controller, the access code communicated in response to determining that the buyer potentially qualifies for a loan sufficient to purchase the available property, wherein the controller is distinct from the device associated with the buyer and the access code is not communicated to the device associated with the buyer.

15. The method of claim 14, wherein one of the buyer preferences comprises a price range, the price range determined by:
receiving a loan request;
determining buyer data associated with the buyer;
generating a potential loan amount according to the buyer data; and
communicating the potential loan amount to facilitate determining the price range.

16. The method of claim 14, further comprising communicating a customized letter to facilitate the access to the available property for the self-service tour, the customized letter indicating that a financial institution pre-qualifies the buyer for a loan sufficient to meet a price associated with the available property located proximate to the buyer.

17. The method of claim 14, further comprising:
receiving feedback describing the buyer's evaluation of the available property;
generating updated buyer preferences according to the feedback;
determining that a second available property satisfies at least a threshold amount of the updated buyer preferences; and
communicating a second notification recommending that the buyer evaluate the second available property.

18. The method of claim 14, further comprising:
receiving a valuation request for valuation data describing the available property;
determining valuation data from a first information source and a second information source;
aggregating the valuation data provided by the first information source with the valuation data provided by the second information source; and
communicating the aggregated valuation data.

19. The method of claim 14, further comprising facilitating determination of an offer amount by:
receiving a request for offer assistance;
determining a potential offer amount based on one or more factors, at least one of the factors comprising a potential loan amount or a customized rate quote; and
communicating the potential offer amount.

20. The method of claim 14, further comprising:
approving the buyer for a self-service tour of the available property; and
providing the buyer with self-service access to the available property.

* * * * *